United States Patent
Fukaya et al.

(10) Patent No.: US 10,351,142 B2
(45) Date of Patent: Jul. 16, 2019

(54) HYBRID VEHICLE

(71) Applicant: TOYOTA JIDOSHA KABUSHIKI KAISHA, Toyota-shi, Aichi-ken (JP)

(72) Inventors: Takashi Fukaya, Miyoshi (JP); Shinjiro Ashida, Miyoshi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/947,331

(22) Filed: Apr. 6, 2018

(65) Prior Publication Data

US 2018/0297601 A1 Oct. 18, 2018

(30) Foreign Application Priority Data

Apr. 18, 2017 (JP) .................. 2017-081898

(51) Int. Cl.
| | |
|---|---|
| *B60K 6/445* | (2007.10) |
| *B60W 30/20* | (2006.01) |
| *B60W 20/14* | (2016.01) |
| *B60W 10/08* | (2006.01) |
| *B60W 10/06* | (2006.01) |
| *B60W 10/115* | (2012.01) |

(52) U.S. Cl.
CPC ............ *B60W 30/20* (2013.01); *B60K 6/445* (2013.01); *B60W 10/06* (2013.01); *B60W 10/08* (2013.01); *B60W 10/115* (2013.01); *B60W 20/14* (2016.01); *B60W 2422/95* (2013.01); *Y02T 10/6239* (2013.01); *Y02T 10/6286* (2013.01)

(58) Field of Classification Search
CPC .... B60W 30/20; B60W 30/14; B60W 10/115; B60W 10/06; B60W 10/08; B60W 2422/95; B60K 6/445; Y02T 10/6286; Y02T 10/6239
See application file for complete search history.

(56) References Cited

U.S. PATENT DOCUMENTS

| | | | |
|---|---|---|---|
| 2011/0074323 A1* | 3/2011 | Mukai ................. | B62D 5/0463 318/400.21 |
| 2014/0092655 A1* | 4/2014 | Igarashi ................ | B60L 3/003 363/56.03 |
| 2016/0152128 A1* | 6/2016 | Minegishi ............ | B60W 10/06 180/65.265 |
| 2016/0153419 A1* | 6/2016 | Minegishi ........... | F02N 11/0866 290/38 C |
| 2017/0088125 A1* | 3/2017 | Shimizu ................ | B60L 50/15 |

(Continued)

FOREIGN PATENT DOCUMENTS

JP 2016-083993 A 5/2016

*Primary Examiner* — Erez Gurari
(74) *Attorney, Agent, or Firm* — Sughrue Mion, PLLC (57) ABSTRACT

In a hybrid vehicle, when an abnormality occurs in a first current sensor and a second current sensor during operation of an engine, a controller is configured to execute one-phase on control to a first inverter, and perform gate shutoff to a second inverter. The controller is configured to, in switching a target phase in the one-phase on control, when an electric angle of a first motor is within a switching range where an assumption is made that a torque difference between torque of the first motor before switching of the target phase and torque of the first motor after switching of the target phase becomes equal to or less than a predetermined value, switch the target phase.

8 Claims, 7 Drawing Sheets

(56) References Cited

U.S. PATENT DOCUMENTS

| | | | |
|---|---|---|---|
| 2017/0096135 A1* | 4/2017 | Kishimoto | B60L 50/51 |
| 2017/0253234 A1* | 9/2017 | Obitsu | B60W 20/50 |
| 2018/0131306 A1* | 5/2018 | Suzuki | H02P 29/024 |
| 2018/0154759 A1* | 6/2018 | Shimizu | B60L 58/12 |
| 2018/0297601 A1* | 10/2018 | Fukaya | B60W 30/20 |

* cited by examiner

| ROTATION SPEED Nm1 | SWITCHING RECOMMENDATION TIME tch1 (sec) |
|---|---|
| LOW | 1.0 |
| ⋮ | ⋮ |
| HIGH | 0.7 |

FIG. 8

| ROTATION SPEED Nm1 | U-PHASE → V-PHASE | | V-PHASE → W-PHASE | | W-PHASE → U-PHASE | |
|---|---|---|---|---|---|---|
| | $\theta uv1$ | $\theta uv2$ | $\theta vw1$ | $\theta vw2$ | $\theta wu1$ | $\theta wu2$ |
| LOW | 320 | 30 | 80 | 150 | 190 | 260 |
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| HIGH | 325 | 330 | 85 | 90 | 200 | 205 |

HYBRID VEHICLE

INCORPORATION BY REFERENCE

The disclosure of Japanese Patent Application No. 2017-081898 filed on Apr. 18, 2017 including the specification, drawings and abstract is incorporated herein by reference in its entirety.

BACKGROUND

1. Technical Field

The present disclosure relates to a hybrid vehicle, and in particular, to a hybrid vehicle including an engine, a planetary gear, a first motor, a second motor, and an electric power storage device.

2. Description of Related Art

As a hybrid vehicle of the related art, a hybrid vehicle in which an engine, a first motor, a drive shaft, and a second motor are connected to a carrier, a sun gear, and a ring gear of a planetary gear, and a first inverter and a second inverter that drive the first motor and the second motor, respectively, are connected to a battery through an electric power line has been suggested. In the hybrid vehicle, when three-phase on and off control of the first inverter cannot be executed in starting the engine during traveling, one of one-phase on control, two-phase on control, and three-phase on control of the first inverter is executed (for example, see Japanese Unexamined Patent Application Publication No. 2016-83993 (JP 2016-83993 A)). In the hybrid vehicle of the related art, drag torque is generated in the first motor in the above-described manner to rotationally drive the engine and fuel is supplied to the engine and ignited, thereby starting the engine.

SUMMARY

In the above-described hybrid vehicle, in executing the one-phase on control to the first inverter, in a case where a target phase (a phase in which one of an upper arm and a lower arm is maintained at an on state) is fixed in the one-phase on control, there is a possibility that a temperature of the first inverter excessively increases. For this reason, while it is considered that the target phase is switched in the one-phase on control, in a case where the torque (drag torque) of the first motor is relatively largely changed at the time of switching, vibration may occur in the vehicle.

The disclosure provides a hybrid vehicle that suppresses the occurrence of vibration in a vehicle.

An aspect of the disclosure relates to a hybrid vehicle. The hybrid vehicle includes an engine, a first motor, a planetary gear, a second motor, a first inverter, a second inverter, an electric power storage device, a first current sensor, a second current sensor, and a controller. The planetary gear has three rotating elements connected to three shafts of the engine, the first motor, and a drive shaft coupled to drive wheels, the three rotating elements being arranged in an order of the first motor, the engine, and the drive shaft in a collinear diagram. The second motor is connected to the drive shaft. The first inverter is configured to drive the first motor. The second inverter is configured to drive the second motor. The electric power storage device is connected to the first inverter and the second inverter through an electric power line. The first current sensor is configured to detect a current flowing in each phase of the first motor. The second current sensor is configured to detect a current flowing in each phase of the second motor. The controller is configured to, when an abnormality occurs in the first current sensor and the second current sensor during operation of the engine, execute one-phase on control to the first inverter and perform gate shutoff to the second inverter. The controller is configured to, in switching target phase in the one-phase on control, when an electric angle of the first motor is within a switching range where an assumption is made that a torque difference between torque of the first motor before switching of the target phase and torque of the first motor after switching of the target phase becomes equal to or less than a predetermined value, switch the target phase.

According to the aspect of the disclosure, when an abnormality occurs in the first current sensor and the second current sensor during operation of the engine, the one-phase on control is executed to the first inverter, and gate shutoff is performed to the second inverter. Here, the "one-phase on control" is control for, with one phase as the target phase, maintaining the upper arm of the target phase at an on state and maintaining the lower arm of the target phase and upper and lower arms of phases other than the target phase at an off state or maintaining the lower arm of the target phase at an on state and maintaining the upper arm of the target phase and the upper and lower arms of the phases other than the target phase at an off state. With such control, drag torque is generated in the first motor, and the drag torque is output to the drive shaft through the planetary gear as torque for forward moving, whereby traveling can be performed. In switching the target phase in the one-phase on control, when the electric angle of the first motor is within the switching range where an assumption is made that the torque difference between the torque of the first motor before switching of the target phase and the torque of the first motor after switching of the target phase becomes equal to or less than the predetermined value, the target phase is switched. With this, upon switching the target phase in the one-phase on control of the first inverter, it is possible to suppress a relatively large change in the torque (drag torque) of the first motor, and to suppress the occurrence of vibration in the vehicle.

In the hybrid vehicle according to the aspect of the disclosure, the switching range may be determined such that the torque difference becomes equal to or less than the predetermined value and an absolute value of at least one of the torque of the first motor before switching of the target phase or the torque of the first motor after switching of the target phase becomes equal to or less than a second predetermined value.

According to the aspect of the disclosure, at the time of switching of the target phase in the one-phase on control of the first inverter, it is possible to further suppress the occurrence of vibration in the vehicle.

In the hybrid vehicle according to the aspect of the disclosure, the switching range may be determined to be narrower as a rotation speed of the first motor increases.

According to the aspect of the disclosure, it is possible to more appropriately determine the switching range.

In the hybrid vehicle according to the aspect of the disclosure, the controller may be configured to switch the target phase when a first time elapses from the previous switching of the target phase and the electric angle of the first motor is within the switching range. In this case, the first time may be determined to be shorter as a rotation speed of the first motor increases.

According to the aspect of the disclosure, it is possible to more appropriately determine the first time.

In the hybrid vehicle according to the aspect of the disclosure, the controller may be configured not to switch the target phase even when the electric angle of the first motor is within the switching range, in a case where a temperature of the first inverter is lower than a predetermined temperature. In this case, i) when a first time elapses from the previous switching of the target phase or ii) when the first time does not elapse from the previous switching of the target phase and a second time shorter than the first time elapses, and the temperature of the first inverter is equal to or higher than the predetermined temperature, the controller may be configured to switch the target phase when the electric angle of the first motor is within the switching range. iii) When the first time does not elapse from the previous switching of the target phase and the temperature of the first inverter is lower than the predetermined temperature, and iv) when the second time does not elapse from the previous switching of the target phase, the controller may be configured not to switch the target phase even when the electric angle of the first motor is within the switching range. With the above-described configuration, it is possible to suppress frequent switching of the target phase (at every extremely short time interval).

In the hybrid vehicle according to the aspect of the disclosure, the controller may be configured to, in a case where the abnormality occurs in the first current sensor and the second current sensor during operation of the engine, execute the one-phase on control to the first inverter when a rotation speed of the first motor is equal to or higher than a predetermined rotation speed and execute three-phase on control when the rotation speed of the first motor is lower than the predetermined rotation speed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is an explanatory view showing an example of a collinear diagram of a planetary gear when an accelerator is on;

DETAILED DESCRIPTION OF EMBODIMENTS

A mode for carrying out the disclosure will be described in connection with an example.

Figure 1:
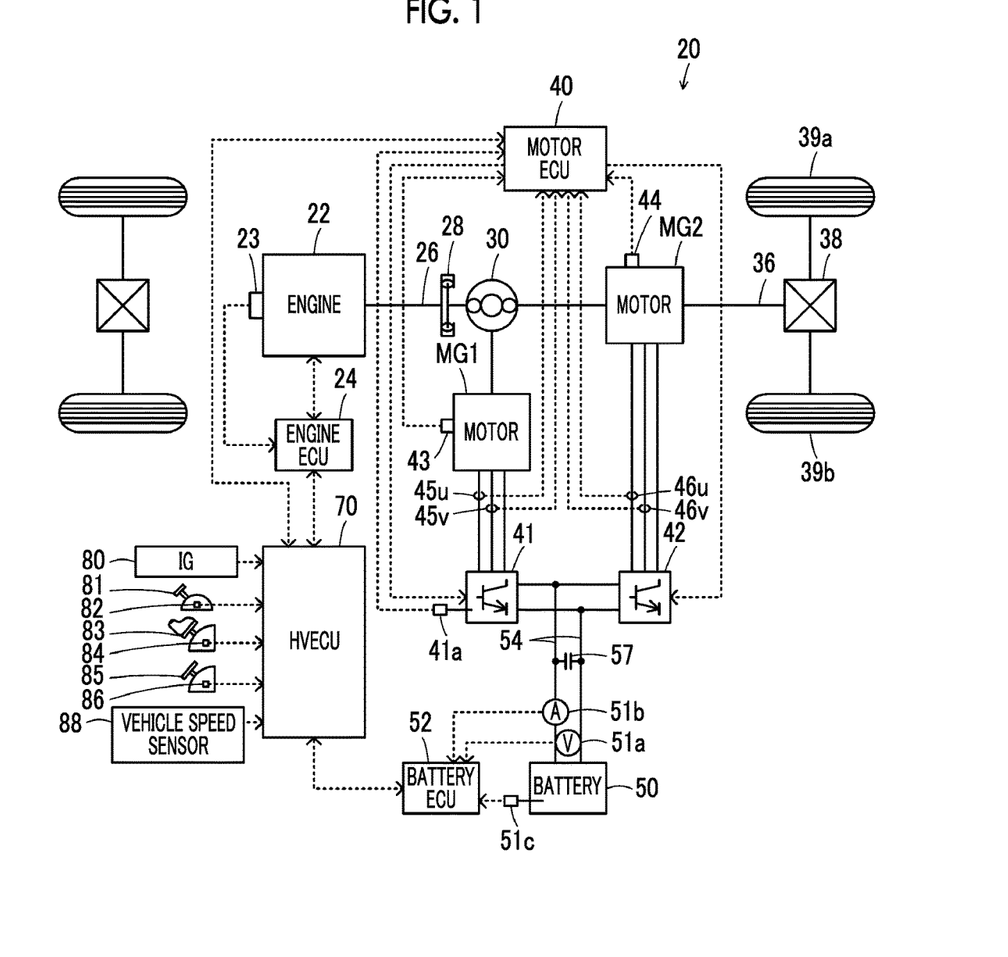
FIG. 1 is a configuration diagram showing the outline of the configuration of a hybrid vehicle as an example of the disclosure.
Figure 2:
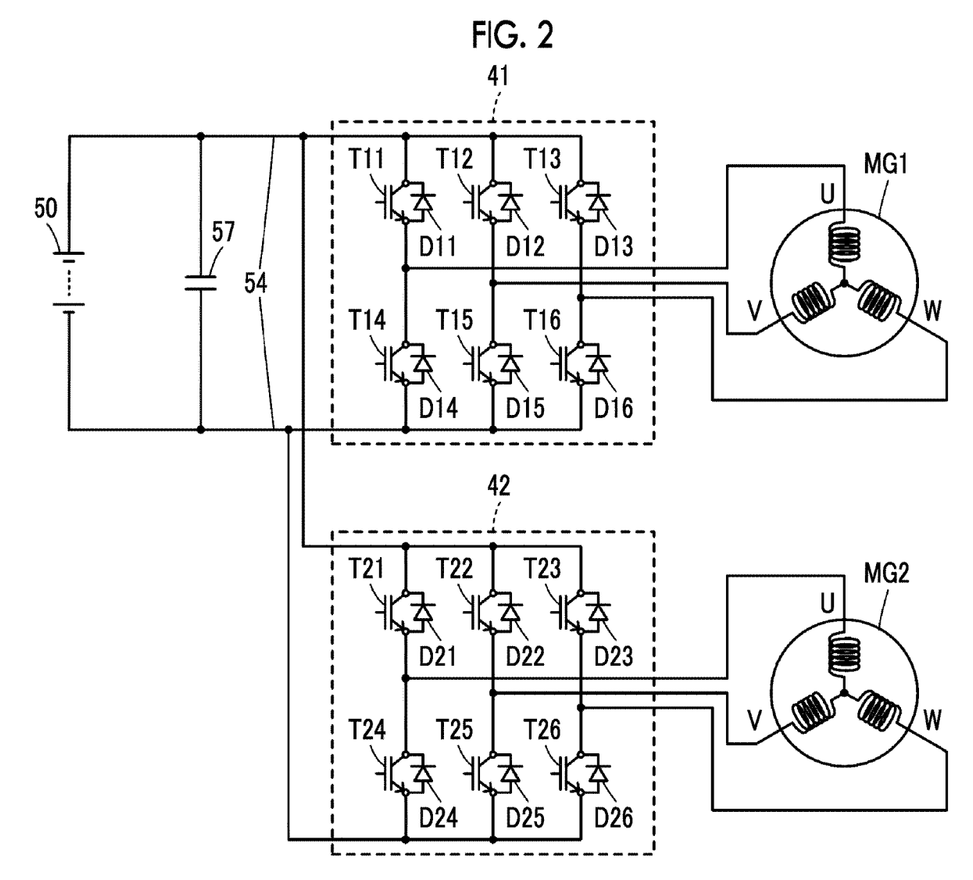
FIG. 2 is a configuration diagram showing the outline of the configuration of an electric machine drive system including a motor.

FIG. 1 is a configuration diagram showing the outline of the configuration of a hybrid vehicle 20 as an example of the disclosure. FIG. 2 is a configuration diagram showing the outline of the configuration of an electric machine drive system including motors MG1, MG2. As shown in the drawing, the hybrid vehicle 20 of the example includes an engine 22, a planetary gear 30, motors MG1, MG2, inverters 41, 42, a battery 50 as an electric power storage device, and an electronic control unit for hybrid (hereinafter, referred to as an "HVECU") 70.

The engine 22 is constituted as an internal combustion engine that outputs power with gasoline, diesel, or the like as fuel, and is connected to a carrier of the planetary gear 30 through a damper 28. Operation of the engine 22 is controlled by an electronic control unit for an engine (hereinafter, referred to as an "engine ECU") 24.

Though not shown, the engine ECU 24 is constituted as a microprocessor centering on a CPU, and includes, in addition to the CPU, a ROM that stores a processing program, a RAM that temporarily stores data, an input/output port, and a communication port. Signals from various sensors needed for controlling operation of the engine 22, for example, a crank angle θcr from a crank position sensor 23 that detects a rotation position of a crankshaft 26 of the engine 22, and the like are input to the engine ECU 24 through the input port. Various control signals for controlling operation of the engine 22 are output from the engine ECU 24 through the output port. The engine ECU 24 is connected to the HVECU 70 through the communication port. The engine ECU 24 calculates a rotation speed Ne of the engine 22 based on the crank angle θcr from the crank position sensor 23.

The planetary gear 30 is constituted as a single-pinion type planetary gear mechanism. A rotor of the motor MG1 is connected to a sun gear of the planetary gear 30. A drive shaft 36 coupled to drive wheels 39a, 39b through a differential gear 38 is connected to a ring gear of the planetary gear 30. As described above, the crankshaft 26 of the engine 22 is connected to a carrier of the planetary gear 30 through the damper 28.

The motor MG1 is constituted as a synchronous motor generator having a rotor embedded with a permanent magnet and a stator wound with three-phase coils, and as described above, the rotor is connected to the sun gear of the planetary gear 30. The motor MG2 is constituted as a synchronous motor generator like the motor MG1, and a rotor is connected to the drive shaft 36.

The inverters 41, 42 are used to drive the motors MG1, MG2. As shown in FIG. 2, the inverter 41 is connected to an electric power line 54, and has six transistors T11 to T16, and six diodes D11 to D16 connected in parallel with the six transistors T11 to T16, respectively. The transistors T11 to T16 are disposed in pairs so as to become a source side and a sink side with respect to a positive electrode side line and a negative electrode side line of the electric power line 54. The three-phase coils (U-phase, V-phase, and W-phase) of the motor MG1 are connected to connection points between the paired transistors of the transistors T11 to T16, respectively. Accordingly, when a voltage is applied to the inverter 41, the ratio of the on time of the paired transistors of the transistors T11 to T16 is adjusted by an electronic control unit for a motor (hereinafter, referred to as a "motor ECU") 40, whereby a rotating magnetic field is formed in the three-phase coils, and the motor MG1 is rotationally driven. Similarly to the inverter 41, the inverter 42 is connected to the electric power line 54, and has six transistors T21 to T26 and six diodes D21 to D26. When a voltage is applied to the inverter 42, the ratio of the on time of the paired transistors of the transistors T21 to T26 is adjusted by the motor ECU 40, whereby a rotating magnetic field is formed in the three-phase coils, and the motor MG2 is rotationally driven. Hereinafter, the transistors T11 to T13, T21 to T23 among the transistors T11 to T16, T21 to T26 are referred to as an "upper arm", and the transistors T14 to T16, T24 to T26 are referred to as a "lower arm". A smoothing capacitor 57 is attached to the positive electrode side line and the negative electrode side line of the electric power line 54.

Though not shown, the motor ECU 40 is constituted as a microprocessor centering on a CPU, and includes, in addition to the CPU, a ROM that stores a processing program, a RAM that temporarily stores data, an input/output port, and a communication port. As shown in FIG. 1, signals from various sensors needed for controlling the drive of the motors MG1, MG2 are input to the motor ECU 40 through the input port. As the signals that are input to the motor ECU 40, for example, rotation positions $\theta m1$, $\theta m2$ from rotation position detection sensors 43, 44 that detect rotation positions of the rotors of the motors MG1, MG2, phase currents Iu1, Iv1, Iu2, Iv2 from current sensors 45$u$, 45$v$, 46$u$, 46$v$ that detect currents flowing in the phases of the motors MG1, MG2, and a temperature tinv of the inverter 41 from a temperature sensor 41$a$ that detects a temperature of the inverter 41 can be exemplified. A switching control signal to the transistors T11 to T16, T21 to T26 of the inverters 41, 42 and the like are output from the motor ECU 40 through the output port. The motor ECU 40 is connected to the HVECU 70 through the communication port. The motor ECU 40 calculates electric angles $\theta e1$, $\theta e2$ or angular velocities $\omega m1$, $\omega m2$, rotation speeds Nm1, Nm2 of the motors MG1, MG2 based on the rotation positions $\theta m1$, $\theta m2$ of the rotors of the motors MG1, MG2 from the rotation position detection sensors 43, 44.

The battery 50 is constituted as, for example, a lithium-ion secondary battery or a nickel-hydrogen secondary battery, and is connected to the electric power line 54. The battery 50 is managed by an electronic control unit for a battery (hereinafter, referred to as a "battery ECU") 52.

Though not shown, the battery ECU 52 is constituted as a microprocessor centering on a CPU, and includes, in addition to the CPU, a ROM that stores a processing program, a RAM that temporarily stores data, an input/output port, and a communication port. Signals from various sensors needed for managing the battery 50 are input to the battery ECU 52 through the input port. As the signals that are input to the battery ECU 52, for example, a voltage Vb of the battery 50 from a voltage sensor 51$a$ attached between the terminals of the battery 50, a current Ib of the battery 50 from a current sensor 51$b$ attached to the output terminal of the battery 50, and a temperature Tb of the battery 50 from a temperature sensor 51$c$ attached to the battery 50 can be exemplified. The battery ECU 52 is connected to the HVECU 70 through the communication port. The battery ECU 52 calculates a state of charge SOC based on an integrated value of the current Ib of the battery 50 from the current sensor 51$b$. The state of charge SOC is the ratio of the capacity of electric power dischargeable from the battery 50 to the total capacity of the battery 50.

Though not shown, the HVECU 70 is constituted as a microprocessor centering on a CPU, and includes, in addition to the CPU, a ROM that stores a processing program, a RAM that temporarily stores data, an input/output port, and a communication port. Signals from various sensors are input to the HVECU 70 through the input port. As the signals that are input to the HVECU 70, for example, an ignition signal from an ignition switch 80, and a shift position SP from a shift position sensor 82 that detects an operation position of a shift lever 81 can be exemplified. An accelerator operation amount Acc from an accelerator pedal position sensor 84 that detects a depression amount of an accelerator pedal 83, a brake pedal position BP from a brake pedal position sensor 86 that detects a depression amount of a brake pedal 85, and a vehicle speed V from a vehicle speed sensor 88 can also be exemplified. The shift position SP includes a parking position (P position), a reverse position (R position), a neutral position (N position), a forward position (D position), and the like. As described above, the HVECU 70 is connected to the engine ECU 24, the motor ECU 40, and the battery ECU 52 through the communication port.

In the hybrid vehicle 20 of the example configured as above, requested drive power of the drive shaft 36 is set based on the accelerator operation amount Acc and the vehicle speed V, and operation of the engine 22 and the motors MG1, MG2 is controlled such that requested power corresponding to the requested drive power is output to the drive shaft 36. As an operation mode of the engine 22 and the motors MG1, MG2, for example, the following modes (A1) to (A3) can be exemplified: (A1) a torque conversion operation mode: a mode in which operation of the engine 22 is controlled such that power corresponding to the requested power is output from the engine 22, and the drive of the motors MG1, MG2 is controlled such that all of the power output from the engine 22 is subjected to torque conversion by the planetary gear 30 and the motors MG1, MG2 and the requested power is output to the drive shaft 36; (A2) a charging and discharging operation mode: a mode in which operation of the engine 22 is controlled such that power corresponding to the sum of the requested power and electric power needed for charging and discharging the battery 50 is output from the engine 22, and the drive of the motors MG1, MG2 is controlled such that all or a part of power output from the engine 22 is subjected to torque conversion by the planetary gear 30 and the motors MG1, MG2 accompanied with charging and discharging of the battery 50, and the requested power is output to the drive shaft 36; and (A3) a motor operation mode: a mode in which operation of the engine 22 is stopped, and the drive of the motor MG2 is controlled such that the requested power is output to the drive shaft 36.

Figure 3:
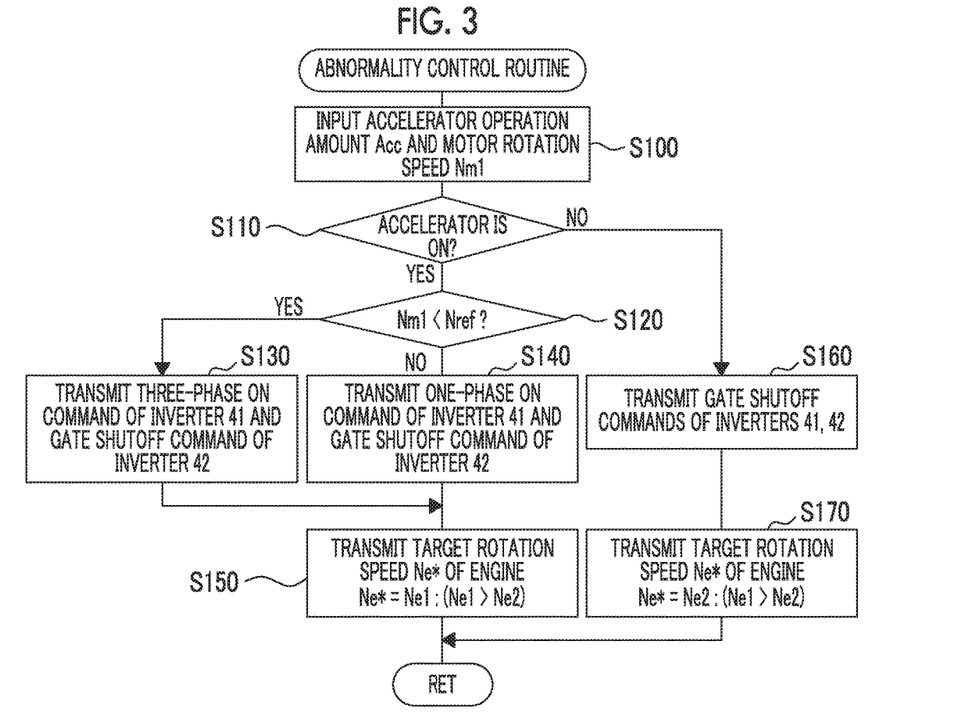
FIG. 3 is a flowchart showing an example of an abnormality control routine that is executed by an HVECU.

The operation of the hybrid vehicle 20 of the example configured as above, and in particular, an operation when an abnormality occurs in the current sensors 45$u$, 45$v$ and the current sensors 46$u$, 46$v$ during operation of the engine 22 will be described. FIG. 3 is a flowchart showing an example of an abnormality control routine that is executed by the HVECU 70. The routine of FIG. 3 is repeatedly executed after an abnormality occurs in the current sensors 45$u$, 45$v$ and the current sensors 46$u$, 46$v$ during operation of the engine 22.

In a case where the abnormality control routine of FIG. 3 is executed, the HVECU 70 receives data, such as the accelerator operation amount Acc and the rotation speed Nm1 of the motor MG1, as input (Step S100). In regard to the accelerator operation amount Acc, a value detected by the accelerator pedal position sensor 84 is input. In regard to the rotation speed Nm1 of the motor MG1, a value calculated based on the rotation position θm1 of the rotor of the motor MG1 detected by the rotation position detection sensor 43 is input from the motor ECU 40 through communication.

Figure 4:
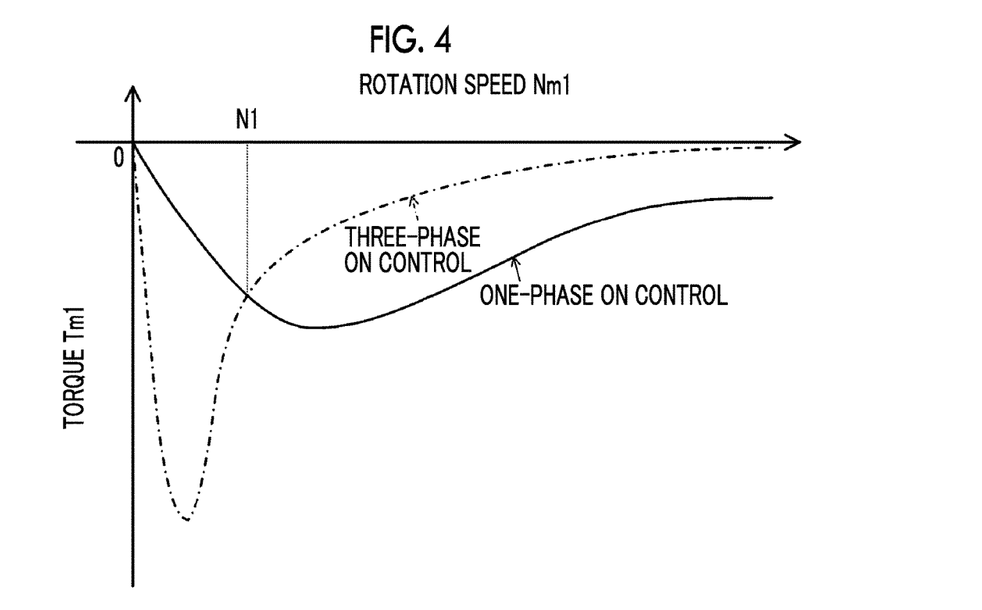
FIG. 4 is a graph showing an example of the relationship between a rotation speed of a motor and drag torque (negative torque) generated in the motor when three-phase on control or one-phase on control is executed to an inverter.

In a case where data is input in the above-described manner, determination is made whether the accelerator is on or off using the input accelerator operation amount Acc (Step S110), and when determination is made that the accelerator is on, the rotation speed Nm1 of the motor MG1 is compared with a threshold Nref (Step S120). The threshold Nref is a threshold that is used in selecting which of three-phase on control and one-phase on control is executed to the inverter 41. The three-phase on control of the inverter 41 is control for maintaining all of the upper arms (transistors T11 to T13) at an on state and maintaining all of the lower arms (transistors T14 to T16) at an off state or maintaining all of the lower arms (transistors T14 to T16) at an on state and maintaining all of the upper arms (transistors T11 to T13) at an off state. The one-phase on control of the inverter 41 is control for maintaining the upper arm of the target phase at an on state and maintaining the lower arm of the target phase and the upper and lower arms of the two phases other than the target phase at an off state or maintaining the lower arm of the target phase at an on state and maintaining the upper arm of the target phase and the upper and lower arms of the two phases other than the target phase at an off state, with one of the U-phase, the V-phase, and the W-phase of the motor MG1 as a target phase. FIG. 4 is a graph showing an example of the relationship between the rotation speed Nm1 of the motor MG1 and drag torque (negative torque) generated in the motor MG1 when the three-phase on control or the one-phase on control is executed to the inverter 41. The above-described relationship is determined through an experiment or an analysis. As shown in the drawing, in a case where the three-phase on control or the one-phase on control is executed to the inverter 41, the drag torque is generated in the motor MG1. In this case, in a region when the rotation speed Nm1 of the motor MG1 is relatively low, the drag torque becomes greater at the time of the three-phase on control than at the time of the one-phase on control. In a region where the rotation speed Nm1 of the motor MG1 is relatively high, the drag torque becomes greater at the time of the one-phase on control than at the time of the three-phase on control. In the example, an assumption is made that a rotation speed N1 as the rotation speed Nm1 of the motor MG1 at which drag torque of the motor MG1 when the three-phase on control is executed to the inverter 41 becomes equal to the drag torque of the motor MG1 when the one-phase on control is executed to the inverter 41 is used as the above-described threshold Nref.

In Step S120, when the rotation speed Nm1 of the motor MG1 is lower than the threshold Nref, a three-phase on control command of the inverter 41 and a gate shutoff command of the inverter 42 are transmitted to the motor ECU 40 (Step S130). When the rotation speed Nm1 of the motor MG1 is equal to or higher than the threshold Nref, a one-phase on control command of the inverter 41 and the gate shutoff command of the inverter 42 are transmitted to the motor ECU 40 (Step S140). A predetermined rotation speed Ne1 (for example, 1800 rpm, 2000 rpm, 2200 rpm, or the like) is set as a target rotation speed Ne* of the engine 22 and transmitted to the engine ECU 24 (Step S150), and the routine ends. In a case where the three-phase on control command of the inverter 41 is received, the motor ECU 40 executes the three-phase on control to the inverter 41. In a case where the one-phase on control command of the inverter 41 is received, the motor ECU 40 executes the one-phase on control to the inverter 41. In a case where the gate shutoff command of the inverter 42 is received, the motor ECU 40 performs gate shutoff of the inverter 42 (turns off all of the transistors T21 to T26). In a case where the target rotation speed Ne* of the engine 22 is received, the engine ECU 24 performs intake air amount control, fuel injection control, ignition control, and the like such that the engine 22 rotates at the target rotation speed Ne*.

Figure 5:
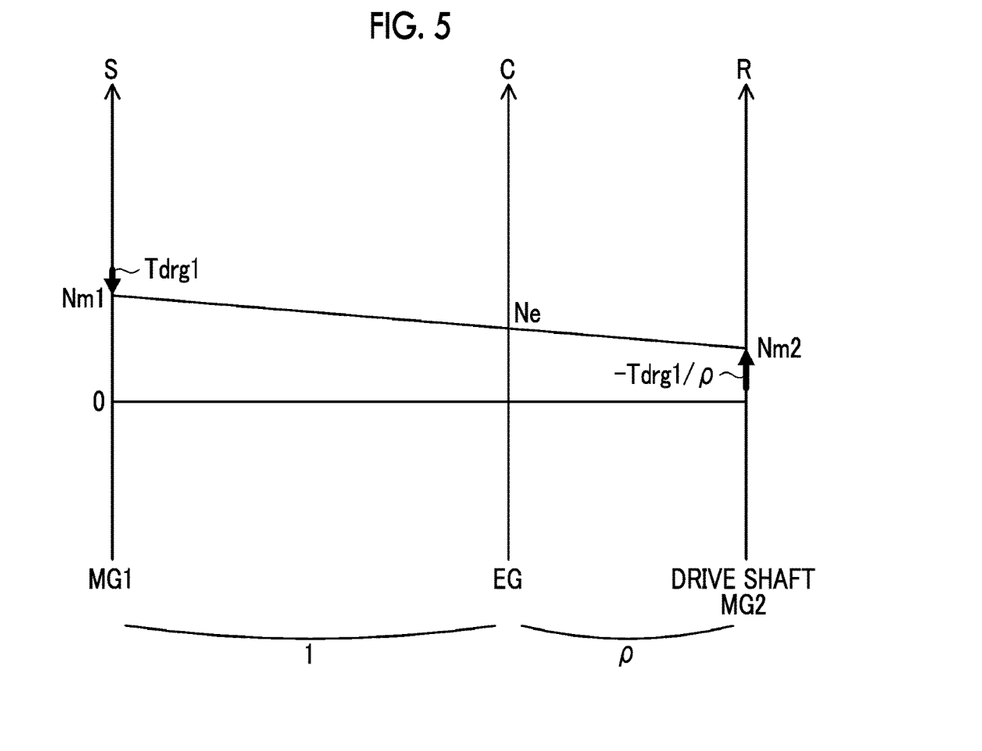

FIG. 5 is an explanatory view showing an example of a collinear diagram of the planetary gear 30 when the accelerator is on, that is, when the three-phase on control or the one-phase on control is executed to the inverter 41 and gate shutoff is performed to the inverter 42. In the drawing, an S axis on the left side indicates a rotation speed of the sun gear of the planetary gear 30 that is the rotation speed Nm1 of the motor MG1, a C axis indicates a rotation speed of the carrier of the planetary gear 30 that is the rotation speed Ne of the engine 22, and an R axis indicates a rotation speed of the ring gear of the planetary gear 30 that is the rotation speed Nm2 of the motor MG2 (and a rotation speed Nd of the drive shaft 36). In the drawing, "ρ" indicates a gear ratio ((the number of teeth of the sun gear)/(the number of teeth of the ring gear)) of the planetary gear 30, and "Tdrg1" indicates the drag torque generated in the motor MG1. When the accelerator is on, the three-phase on control or the one-phase on control is executed to the inverter 41, whereby the drag torque Tdrg1 generated in the motor MG1 is output to the drive shaft 36 through the planetary gear 30 as torque (−Tdrg1/ρ) for forward moving, and traveling can be performed. In addition, when the rotation speed Nm1 of the motor MG1 is lower than the threshold Nref, the three-phase on control is executed to the inverter 41, and when the rotation speed Nm1 of the motor MG1 is equal to or higher than the threshold Nref, the one-phase on control is executed to the inverter 41, whereby it is possible to further increase the drag torque Tdrg1 generated in the motor MG1, and to further increase the torque (−Tdrg1/ρ) for forward moving output to the drive shaft 36.

In Step S110, when determination is made that the accelerator is off, the gate shutoff command of the inverters 41, 42 is transmitted to the motor ECU 40 (Step S160), a predetermined rotation speed Ne2 (for example, 1000 rpm, 1200 rpm, 1400 rpm, or the like) lower than the predetermined rotation speed Ne1 is set as the target rotation speed Ne* of the engine 22 and transmitted to the engine ECU 24 (Step S170), and the routine ends. In a case where the gate shutoff command of the inverters 41, 42 is received, the motor ECU 40 performs gate shutoff of the inverters 41, 42 (turns off all of the transistors T11 to T16, T21 to T26). The control of the engine 22 by the engine ECU 24 has been described above. When gate shutoff is performed to the inverter 41, and when a counter electromotive voltage generated with the rotation of the motor MG1 is higher than the voltage of the electric power line 54, regenerative torque Tcef1 based on the counter electromotive voltage is generated in the motor MG1, and the regenerative torque Tcef1 is output to the drive shaft 36 through the planetary gear 30 as torque (−Tcef1/ρ) for forward moving. When the counter electromotive voltage of the motor MG1 is equal to or lower than the voltage of the electric power line 54, since the regenerative torque Tcef1 is not generated in the motor MG1 (becomes a value of 0), the torque (−Tcef1/ρ) of the drive shaft 36 becomes a value of 0. Based on this, in the example, when the accelerator is off, the rotation speed Ne of the engine 22 decreases to decrease the rotation speed Nm1 of the motor MG1 compared to when the accelerator is on, such that the counter electromotive voltage of the motor MG1 becomes equal to or lower than the voltage of the electric power line 54.

Figure 6:
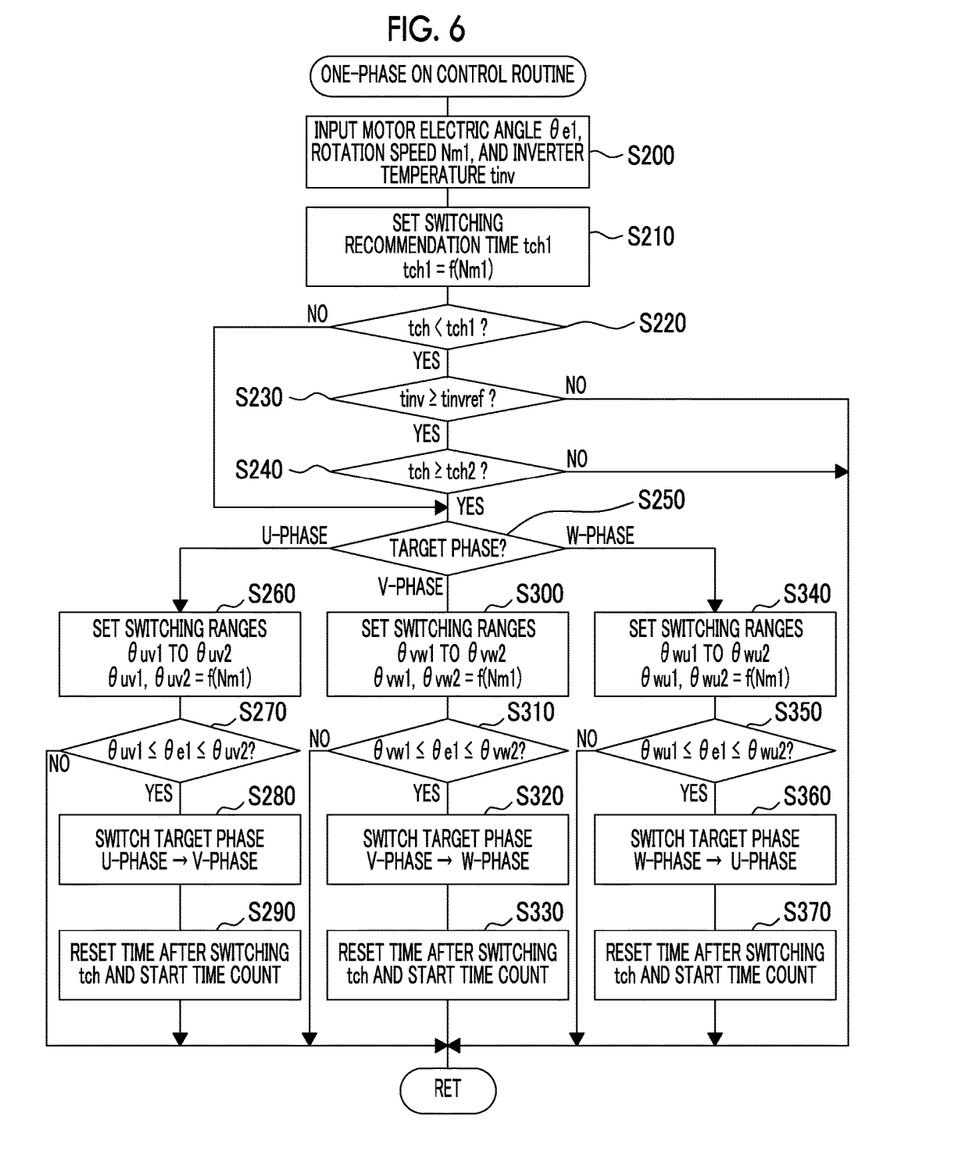
FIG. 6 is a flowchart showing an example of a one-phase on control routine that is executed by a motor ECU.

The operation in a case where the one-phase on control is executed to the inverter 41 will be described. FIG. 6 is a flowchart showing an example of a one-phase on control routine that is executed by the motor ECU 40. The routine of FIG. 6 is repeatedly executed in a case where the one-phase on control is executed to the inverter 41 (when the one-phase on control command of the inverter 41 is received from the HVECU 70). In the following description, as the one-phase on control of the inverter 41, a case where the upper arm of the target phase is maintained at an on state and the lower arm of the target phase and the upper and lower arms of the two phases other than the target phase are maintained at an off state will be described.

In a case where the one-phase on control routine of FIG. 6 is executed, the motor ECU 40 receives data, such as the electric angle $\theta e1$ or the rotation speed Nm1 of the motor MG1 or the temperature tinv of the inverter 41, as input (Step S200). In regard to the electric angle $\theta e1$ or the rotation speed Nm1 of the motor MG1, a value calculated based on the rotation position $\theta m1$ of the rotor of the motor MG1 detected by the rotation position detection sensor 43 is input.

Figure 7:
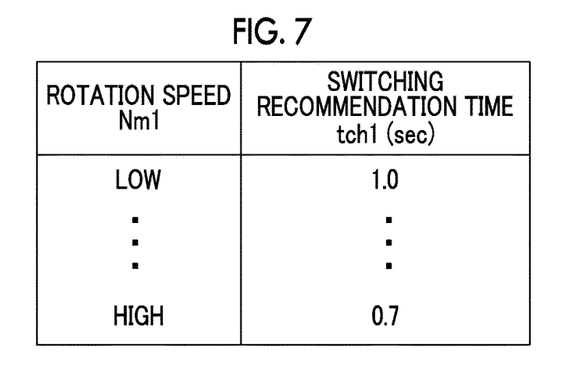
FIG. 7 is an explanatory view showing an example of a switching recommendation time setting map.

In a case where data is input in the above-described manner, a switching recommendation time tch1 is set based on the rotation speed Nm1 of the motor MG1 (Step S210). The switching recommendation time tch1 is a lower limit time at which switching of the target phase in the one-phase on control of the inverter 41 is recommended. In the example, the relationship between the rotation speed Nm1 of the motor MG1 and the switching recommendation time tch1 is determined in advance and stored in the ROM (not shown) as a switching recommendation time setting map, and in a case where the rotation speed Nm1 of the motor MG1 is given, the corresponding switching recommendation time tch1 is derived from the map and set. FIG. 7 shows an example of the switching recommendation time setting map. Respective values of the switching recommendation time tch1 are not limited to values of the map of FIG. 7. As shown in the drawing, the switching recommendation time tch1 is set to be shorter when the rotation speed Nm1 of the motor MG1 is high than when the rotation speed Nm1 of the motor MG1 is low, specifically, to be shorter as the rotation speed Nm1 of the motor MG1 increases. This is because, as the rotation speed Nm1 of the motor MG1 increases, an absolute value of a current flowing in the target phase is likely to be greater, and thermal stress is likely to be greater.

Figure 8:
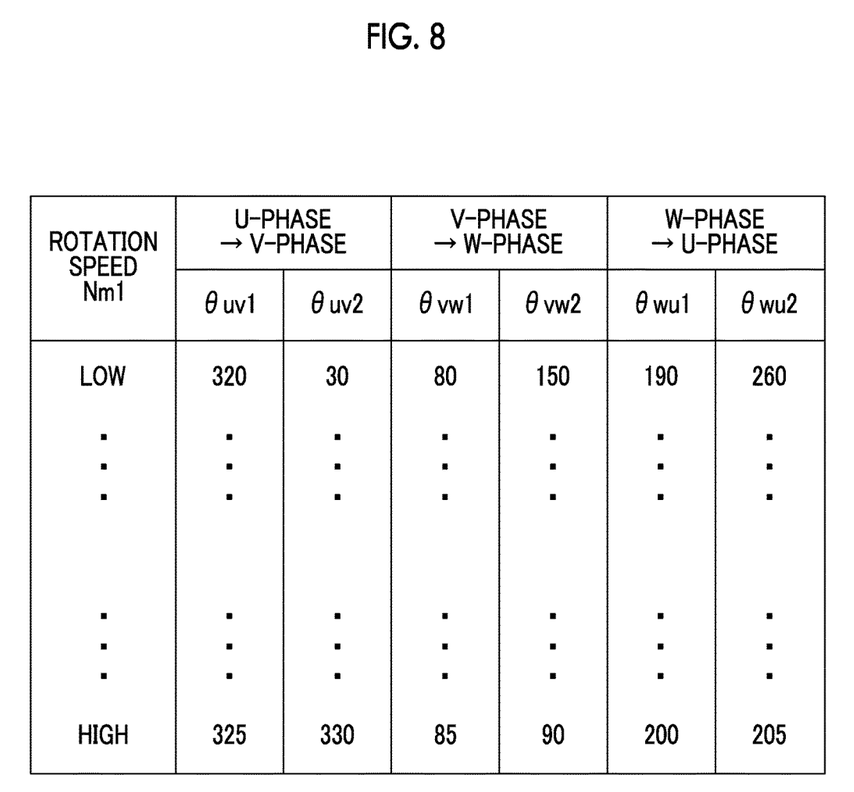
FIG. 8 is an explanatory view showing an example of a switching range setting map.

Subsequently, a time after switching tch after the target phase is switched previously in the one-phase on control of the inverter 41 is compared with the switching recommendation time tch1 (Step S220). When the time after switching tch is equal to or longer than the switching recommendation time tch1, determination is made that switching of the target phase in the one-phase on control of the inverter 41 is recommended, and determination is made on which of the U-phase, the V-phase, and the W-phase the current target phase in the one-phase on control of the inverter 41 is (Step S250). When the current target phase in the one-phase on control of the inverter 41 is the U-phase, switching ranges $\theta uv1$ to $\theta uv2$ are set based on the rotation speed Nm1 of the motor MG1 and the switching range setting map of FIG. 8 (Step S260). The switching ranges $\theta uv1$ to $\theta uv2$ and switching ranges $\theta vw1$ to $\theta vw2$, $\theta wu1$ to $\theta wu2$ described below are ranges suitable for switching the target phase from the U-phase to the V-phase, from the V-phase to the W-phase, and from the W-phase to the U-phase, respectively, and are determined such that both of (B1) a condition that the torque difference $\Delta Tm1$ between torque before switching of the target phase and torque after switching of the target phase becomes equal to or less than a threshold $\Delta Tref$ (for example, 8 Nm, 10 Nm, 12 Nm, or the like), and (B2) a condition that both of an absolute value of the torque before switching of the target phase and an absolute value of the torque after switching of the target phase become equal to or less than a threshold Tref (for example, 8 Nm, 10 Nm, 12 Nm, or the like) are satisfied. The switching range setting map of FIG. 8 is a map that indicates an example of the relationship between the rotation speed Nm1 of the motor MG1 and the switching ranges $\theta uv1$ to $\theta uv2$, $\theta vw1$ to $\theta vw2$, $\theta wu1$ to $\theta wu2$, and is stored in the ROM (not shown). Respective values of the switching range $\theta uv1$ to $\theta uv2$, $\theta vw1$ to $\theta vw2$, $\theta wu1$ to $\theta wu2$ are not limited to values of the map of FIG. 8.

Figure 9:
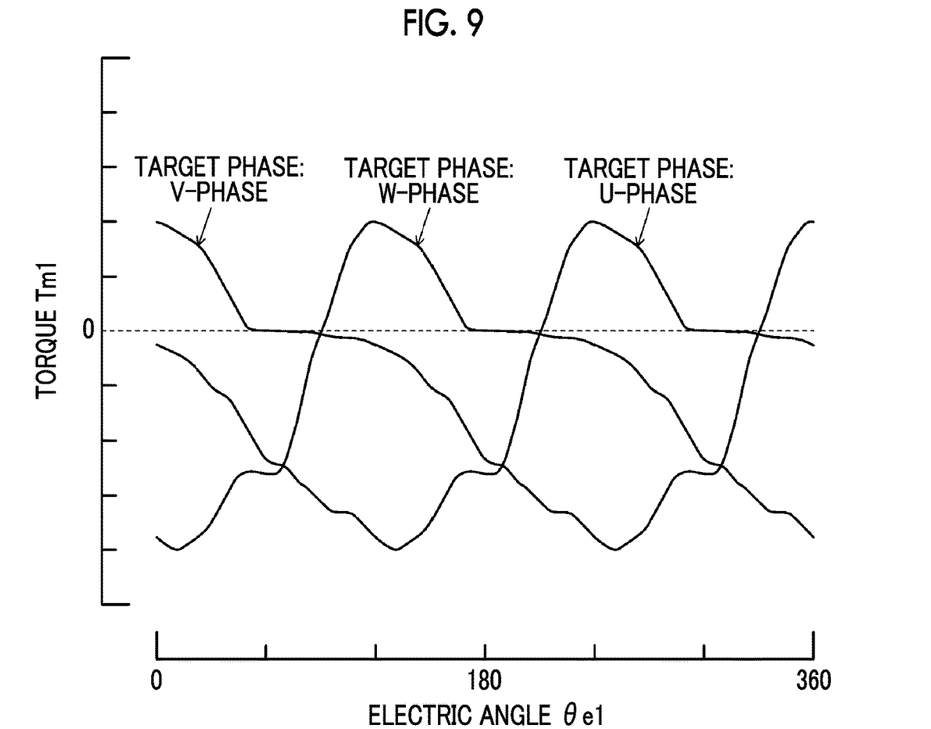
FIG. 9 is a graph showing an example of the relationship between an electric angle and torque of a motor when a rotation speed of the motor is a certain rotation speed and a target phase is a U-phase, a V-phase, and a W-phase.

FIG. 9 is a graph showing an example of the relationship between the electric angle $\theta e1$ and torque Tm1 of the motor MG1 when the rotation speed Nm1 of the motor MG1 is a certain rotation speed and the target phase is the U-phase, the V-phase, and the W-phase. The relationship varies according to the rotation speed Nm1 of the motor MG1. In FIG. 9, when the torque Tm1 of the motor MG1 is negative, this means that the drag torque is generated in the motor MG1. In FIG. 9, average torque in one cycle (for 360 degrees at the electric angle $\theta e1$) of the motor MG1 corresponds the torque (drag torque) of the motor MG1 when the one-phase on control is executed to the inverter 41 in FIG. 4 described above. In the example, the switching ranges $\theta uv1$ to $\theta uv2$, $\theta vw1$ to $\theta vw2$, $\theta wu1$ to $\theta wu2$ are determined with respect to the respective rotation speeds Nm1 of the motor MG1 such that both conditions (B1), (B2) are satisfied using the relationship of FIG. 9, and the switching range setting map of FIG. 8 is created. As will be understood from FIG. 8, the switching ranges $\theta uv1$ to $\theta uv2$, $\theta vw1$ to $\theta vw2$, $\theta wu1$ to $\theta wu2$ are set to be narrower as the rotation speed Nm1 of the motor MG1 increases. This is because fluctuation in the torque Tm1 of the motor MG1 becomes greater as the rotation speed Nm1 of the motor MG1 increases.

In a case where the switching range $\theta uv1$ to $\theta uv2$ is set in the above-described manner, determination is made whether or not the electric angle $\theta e1$ of the motor MG1 is within the switching range $\theta uv1$ to $\theta uv2$ (Step S270). When determination is made that the electric angle $\theta e1$ of the motor MG1 is not within the switching range $\theta uv1$ to $\theta uv2$ (outside the switching range $\theta uv1$ to $\theta uv2$), the routine ends without switching the target phase in the one-phase on control of the inverter 41. When determination is made that the electric angle $\theta e1$ of the motor MG1 is within the switching range $\theta uv1$ to $\theta uv2$, the target phase in the one-phase on control of the inverter 41 is switched from the U-phase to the V-phase (Step S280), the time after switching tch is reset to a value of 0 and time count starts (Step S290), and the routine ends.

In Step S250, when the current target phase in the one-phase on control of the inverter 41 is the V-phase, the switching range $\theta vw1$ to $\theta vw2$ is set based on the rotation speed Nm1 of the motor MG1 and the switching range setting map of FIG. 8 described above (Step S300), and determination is made whether or not the electric angle $\theta e1$ of the motor MG1 is within the switching range $\theta vw1$ to $\theta vw2$ (Step S310). When determination is made that the electric angle $\theta e1$ of the motor MG1 is not within the switching range $\theta vw1$ to $\theta vw2$ (outside the switching range θvw1 to θvw2), the routine ends without switching the target phase in the one-phase on control of the inverter 41. When determination is made that the electric angle θe1 of the motor MG1 is within the switching range θvw1 to θvw2, the target phase in the one-phase on control of the inverter 41 is switched from the V-phase to the W-phase (Step S320), the time after switching tch is reset to the value of 0 and time count starts (Step S330), and the routine ends.

In Step S250, when the current target phase in the one-phase on control of the inverter 41 is the W-phase, the switching range θwu1 to θwu2 is set based on the rotation speed Nm1 of the motor MG1 and the switching range setting map of FIG. 8 described above (Step S340), and determination is made whether or not the electric angle θe1 of the motor MG1 is within the switching range θwu1 to θwu2 (Step S350). When determination is made that the electric angle θe1 of the motor MG1 is not within the switching range θwu1 to θwu2 (outside the switching range θwu1 to θwu2), the routine ends without switching the target phase in the one-phase on control of the inverter 41. When determination is made that the electric angle θe1 of the motor MG1 is within the switching range θwu1 to θwu2, the target phase in the one-phase on control of the inverter 41 is switched from the W-phase to the U-phase (Step S360), the time after switching tch is reset to the value of 0 and time count starts (Step S370), and the routine ends.

As described above, when the electric angle θe1 of the motor MG1 is within the switching range determined such that the above-described condition (B1) is satisfied, at the time of switching of the target phase in the one-phase on control of the inverter 41, the target phase in the one-phase on control of the inverter 41 is switched, whereby it is possible to suppress relatively large change of the torque (drag torque) of the motor MG1, and to suppress the occurrence of vibration in the vehicle. In addition, since the switching range is determined such that the condition (B2) is satisfied in addition to the condition (B1), at the time of switching of the target phase in the one-phase on control of the inverter 41, it is possible to further suppress the occurrence of vibration in the vehicle.

In Step S220, when the time after switching tch is shorter than the switching recommendation time tch1, the temperature tinv of the inverter 41 is compared with a threshold tinvref (Step S230), and when the temperature tinv of the inverter 41 is equal to or higher than the threshold tinvref, the time after switching tch is compared with a switching permission time tch2 shorter than the above-described switching recommendation time tch1 (Step S240). The threshold tinvref is a lower limit temperature at which determination is made that it is desirable to switch the target phase in the one-phase on control of the inverter 41 in order to suppress an increase in temperature of the inverter 41, and for example, 70° C., 80° C., 90° C., or the like can be used as a temperature lower than a temperature, at which the inverter 41 is overheated, to some extent. The switching permission time tch2 is a lower limit time at which switching of the target phase in the one-phase on control of the inverter 41 is permitted (prohibition is released), and for example, 0.1 sec, 0.2 sec, 0.3 sec, or the like can be used.

In Step S230, when the temperature tinv of the inverter 41 is lower than the threshold tinvref or in Step S240, when the time after switching tch is shorter than the switching permission time tch2, the routine ends without switching the target phase in the one-phase on control of the inverter 41. With this, it is possible to suppress frequent switching of the target phase in the one-phase on control of the inverter 41 (at every extremely short time interval).

In Step S230, when the temperature tinv of the inverter 41 is equal to or higher than the threshold tinvref, and in Step S240, when the time after switching tch is equal to or longer than the switching permission time tch2, the processing after Step S250 described above is executed, that is, when the electric angle θe1 of the motor MG1 is within the switching range, the target phase in the one-phase on control of the inverter 41 is switched, and the routine ends.

In the hybrid vehicle 20 of the example described above, when an abnormality occurs in the current sensors 45u, 45v and the current sensors 46u, 46v during operation of the engine 22, the three-phase on control or the one-phase on control is executed to the inverter 41, and gate shutoff is performed to the inverter 42. With this, the drag torque generated in the motor MG1 is output to the drive shaft 36 through the planetary gear 30 as torque for forward moving, and traveling can be performed. In switching the target phase in the one-phase on control of the inverter 41, when the electric angle θe1 of the motor MG1 is within the switching range determined such that the condition that the torque difference ΔTm1 between torque before switching of the target phase and torque after switching of the target phase becomes equal to or less than the threshold ΔTref is satisfied, the target phase in the one-phase on control of the inverter 41 is switched. With this, at the time of switching of the target phase in the one-phase on control of the inverter 41, it is possible to suppress relatively large change in the torque (drag torque) of the motor MG1, and to suppress the occurrence of vibration in the vehicle. In addition, the switching range is determined such that the condition that both of the absolute value of torque before switching of the target phase and the absolute value of torque after switching of the target phase become equal to or less than the threshold Tref is also satisfied, in addition to the condition that the torque difference ΔTm1 between torque before switching of the target phase and torque after switching of the target phase becomes equal to or less than the threshold ΔTref. With this, at the time of switching of the target phase in the one-phase on control of the inverter 41, it is possible to suppress the occurrence of vibration in the vehicle.

In the hybrid vehicle 20 of the example, the switching ranges θuv1 to θuv2, θvw1 to θvw2, θwu1 to θwu2 are determined using the above-described conditions (B1), (B2). However, the switching ranges θuv1 to θuv2, θvw1 to θvw2, θwu1 to θwu2 may be determined solely using the above-described condition (B1).

In the hybrid vehicle 20 of the example, the switching ranges θuv1 to θuv2, θvw1 to θvw2, θwu1 to θwu2 are set based on the rotation speed Nm1 of the motor MG1. However, the switching ranges θuv1 to θuv2, θvw1 to θvw2, θwu1 to θwu2 may be set without consideration of the rotation speed Nm1 of the motor MG1.

In the hybrid vehicle 20 of the example, the switching recommendation time tch1 is set based on the rotation speed Nm1 of the motor MG1. However, a constant time may be used as the switching recommendation time tch1 regardless of the rotation speed Nm1 of the motor MG1.

In the hybrid vehicle 20 of the example, when the time after switching tch is equal to or longer than the switching recommendation time tch1 and the electric angle θe1 of the motor MG1 is within the switching range, and when the temperature tinv of the inverter 41 is equal to or higher than the threshold tinvref, the time after switching tch is equal to or longer than the switching permission time tch2, and the electric angle θe1 of the motor MG1 is within the switching range, the target phase in the one-phase on control of the inverter 41 is switched. However, solely either in a case when the time after switching tch is equal to or longer than the switching recommendation time tch1 and the electric angle θe1 of the motor MG1 is within the switching range, or in a case when the temperature tinv of the inverter 41 is equal to or higher than the threshold tinvref, the time after switching tch is equal to or longer than the switching permission time tch2, and the electric angle θe1 of the motor MG1 is within the switching range, the target phase in the one-phase on control of the inverter 41 may be switched.

In the hybrid vehicle 20 of the example, when the time after switching tch is shorter than the switching recommendation time tch1, and when the temperature tinv of the inverter 41 is equal to or higher than the threshold tinvref, the time after switching tch is equal to or longer than the switching permission time tch2, and the electric angle θe1 of the motor MG1 is within the switching range, the target phase in the one-phase on control of the inverter 41 is switched. However, when the temperature tinv of the inverter 41 is equal to or higher than the threshold tinvref and the electric angle θe1 of the motor MG1 is within the switching range, the target phase in the one-phase on control of the inverter 41 may be switched regardless of whether or not the time after switching tch is equal to or longer than the switching permission time tch2. When the electric angle θe1 of the motor MG1 is within the switching range, the target phase in the one-phase on control of the inverter 41 may be switched regardless of whether or not the temperature tinv of the inverter 41 is equal to or higher than the threshold tinvref and whether or not the time after switching tch is equal to or longer than the switching permission time tch2.

In the hybrid vehicle 20 of the example, when an abnormality occurs in the current sensors 45u, 45v and the current sensors 46u, 46v during operation of the engine 22, the three-phase on control or the one-phase on control is executed to the inverter 41 according to the rotation speed Nm1 of the motor MG1. However, the one-phase on control may be executed to the inverter 41 regardless of the rotation speed Nm1 of the motor MG1.

In the hybrid vehicle 20 of the example, although the battery 50 is used as an electric power storage device, a capacitor may be used as an electric power storage device.

In the hybrid vehicle 20 of the example, although the motor MG2 is connected directly to the drive shaft 36, the motor MG2 may be connected to the drive shaft 36 through a decelerator, a transmission, or the like.

In the hybrid vehicle 20 of the example, although the engine ECU 24, the motor ECU 40, the battery ECU 52, and the HVECU 70 are provided, at least two of these may be constituted as a single electronic control unit.

In the example, the engine 22 is described as an "engine", the motor MG1 is described as a "first motor", the planetary gear 30 is described as a "planetary gear", the motor MG2 is described as a "second motor", the inverter 41 is described as a "first inverter", the inverter 42 is described as a "second inverter", the battery 50 is described as an "electric power storage device", the current sensors 45u, 45v are described as a "first current sensor", the current sensors 46u, 46v are described as a "second current sensor", and the HVECU 70, the engine ECU 24, and the motor ECU 40 are described as a "controller"; however, this is an example of the disclosure.

The correspondence relationship between the primary components of the example and the primary components described in "SUMMARY" should not be considered to limit the components of the disclosure described in "SUMMARY" since the example is merely illustrative to specifically describe the aspects of the disclosure described in "SUMMARY". That is, the disclosure described in "SUMMARY" should be interpreted based on the description in "SUMMARY", and the example is merely a specific example of the disclosure described in "SUMMARY".

Although the mode for carrying out the disclosure has been described above in connection with the example, the disclosure is not limited to the example, and can be of course carried out in various forms without departing from the spirit and scope of the disclosure.

The disclosure is usable in the manufacturing industry of a hybrid vehicle, or the like.

What is claimed is:

1. A hybrid vehicle comprising:
an engine;
a first motor;
a planetary gear having three rotating elements connected to three shafts of the engine, the first motor, and a drive shaft coupled to drive wheels, the three rotating elements being arranged in an order of the first motor, the engine, and the drive shaft in a collinear diagram;
a second motor connected to the drive shaft;
a first inverter configured to drive the first motor;
a second inverter configured to drive the second motor;
an electric power storage device connected to the first inverter and the second inverter through an electric power line;
a first current sensor configured to detect a current flowing in each phase of the first motor;
a second current sensor configured to detect a current flowing in each phase of the second motor; and
a controller configured to, when an abnormality occurs in the first current sensor and the second current sensor during operation of the engine, execute one-phase on control to the first inverter and perform gate shutoff to the second inverter,
wherein the controller is configured to, in switching a target phase in the one-phase on control, when an electric angle of the first motor is within a switching range where an assumption is made that a torque difference between torque of the first motor before switching of the target phase and torque of the first motor after switching of the target phase becomes equal to or less than a predetermined value, switch the target phase.

2. The hybrid vehicle according to claim 1, wherein the switching range is determined such that the torque difference becomes equal to or less than the predetermined value and an absolute value of at least one of the torque of the first motor before switching of the target phase or the torque of the first motor after switching of the target phase becomes equal to or less than a second predetermined value.

3. The hybrid vehicle according to claim 1, wherein the switching range is determined to be narrower as a rotation speed of the first motor increases.

4. The hybrid vehicle according to claim 1, wherein the controller is configured to switch the target phase when a first time elapses from previous switching of the target phase and the electric angle of the first motor is within the switching range.

5. The hybrid vehicle according to claim 4, wherein the first time is determined to be shorter as a rotation speed of the first motor increases.

6. The hybrid vehicle according to claim 1, wherein the controller is configured not to switch the target phase even when the electric angle of the first motor is within the switching range, in a case where a temperature of the first inverter is lower than a predetermined temperature.

7. The hybrid vehicle according to claim 6, wherein:
i) when a first time elapses from previous switching of the target phase or
ii) when the first time does not elapse from previous switching of the target phase and a second time shorter than the first time elapses, and the temperature of the first inverter is equal to or higher than the predetermined temperature, the controller is configured to switch the target phase when the electric angle of the first motor is within the switching range; and
iii) when the first time does not elapse from previous switching of the target phase and the temperature of the first inverter is lower than the predetermined temperature, and
iv) when the second time does not elapse from previous switching of the target phase, the controller is configured not to switch the target phase even when the electric angle of the first motor is within the switching range.

8. The hybrid vehicle according to claim 1, wherein the controller is configured to, in a case where the abnormality occurs in the first current sensor and the second current sensor during operation of the engine,
execute the one-phase on control to the first inverter when a rotation speed of the first motor is equal to or higher than a predetermined rotation speed, and
execute three-phase on control when the rotation speed of the first motor is lower than the predetermined rotation speed.

\* \* \* \* \*